United States Patent [19]

Knight

[11] 4,234,014
[45] Nov. 18, 1980

[54] BOWL FOR COMPRESSED AIR OR GAS FILTER OR LUBRICATOR

[75] Inventor: Roger E. Knight, London, England

[73] Assignee: IMI Norgren Limited, Warwickshire, England

[21] Appl. No.: 43,211

[22] Filed: May 29, 1979

[30] Foreign Application Priority Data

May 31, 1978 [GB] United Kingdom ............... 25373/78

[51] Int. Cl.$^3$ .............................................. E03B 7/07
[52] U.S. Cl. .................. 137/557; 184/55 A; 220/3; 220/410; 220/468; 137/797; 55/274; 55/310; 55/435
[58] Field of Search ......................... 55/274, 310, 435; 261/DIG. 65; 184/55 A, 55 R; 220/403, 3, 404, 410, 461, 468, 82 R, DIG. 27; 137/587-589, 797, 557

[56] References Cited

U.S. PATENT DOCUMENTS

| | | | |
|---|---|---|---|
| 3,114,968 | 12/1963 | Rudelick | 220/3 |
| 3,182,750 | 5/1965 | Gleason et al. | 220/82 R |
| 3,241,700 | 3/1966 | Lansky et al. | 184/55 A |
| 3,527,027 | 9/1970 | Knight et al. | 55/275 |
| 3,724,712 | 4/1973 | Starr et al. | 220/461 |
| 4,015,959 | 4/1977 | Grote | 55/274 |

*Primary Examiner*—Bernard Nozick
*Attorney, Agent, or Firm*—Sheridan, Ross, Fields & McIntosh

[57] ABSTRACT

A processing apparatus for compressed air comprises a body defining inlet and outlet passages leading to a bowl supported by the body. The bowl is of composite construction comprising a flexible inner bowl and a high impact strength outer bowl formed from polycarbonate for protecting the internal bowl from external damage. The inner bowl has an annular flange trapped between the outer bowl and the body to form a gas-tight seal between them, and is formed from a material which will protect the outer bowl from solvent and/or chemical attack. The outer bowl has a small vent to atmosphere to allow controlled venting of the compressed air in the event of inner bowl failure without allowing fragments from the inner bowl to pass through the vent. Both bowls are made of translucent or transparent materials so that the contents of the inner bowl can clearly be seen.

15 Claims, 1 Drawing Figure

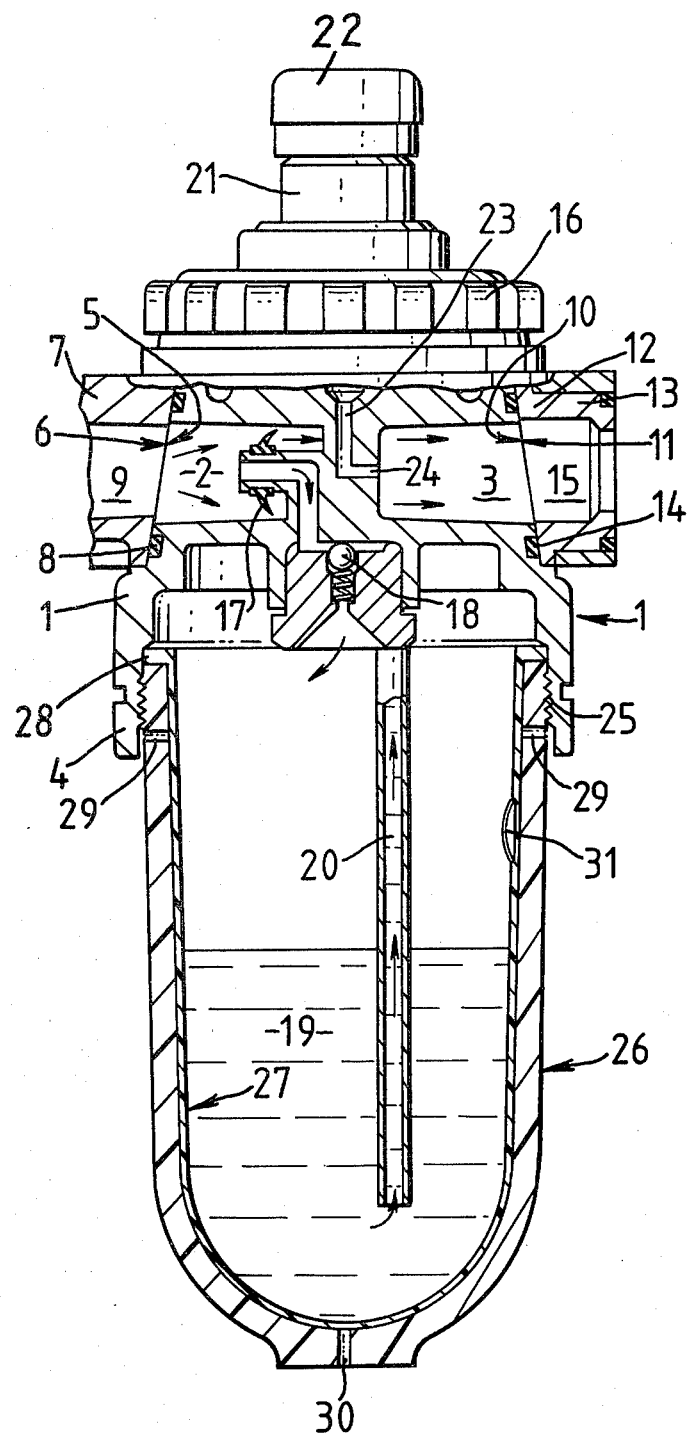

BOWL FOR COMPRESSED AIR OR GAS FILTER OR LUBRICATOR

The invention relates to a bowl for use in a compressed air or gas filter or lubricator and to such filter or lubricator equipped with the bowl.

It is well known for a compressed air filter to be provided with a bowl for collecting water and other filtered fluids, such as oil from the compressor, and for the bowl to be transparent or translucent so that the level of collected fluid can be seen. Knowledge of the fluid level is important where the filter has a manual drain device. It is also desirable for confirming the correct operation of an automatic drain device. It is also well known for a compressed air lubricator to be provided with a bowl for the lubricating oil and for this bowl to be transparent or translucent so that the amount of lubricating oil available for dispensation by the lubricator can be seen at a glance and a decision taken when replenishment is necessary. Such bowls are typically made of polycarbonate—a high strength plastic which normally fails in a ductile manner if subjected to overstressing.

Failure in a ductile rather than a brittle manner is essential as the bowls may be subjected to an internal pressure of up to 10 bar gauge.

Certain plastics including polycarbonate are subject to attack by solvents in common use in industry and are also attacked by certain types of lubricating fluids and their additives—these fluids may be mineral oils, synthetic lubricants or any other fluid likely to be dispensed by compressed air lubricators. This attack may cause the plastics bowl to fail in a brittle manner and, because of the high kinetic energy due to the entrapped air pressure, particles may be ejected with considerable force causing a hazard to workers in the vicinity.

Certain plastics, highly resistant to attack by solvents or chemicals, are unsuitable for use as bowls either because they are insufficiently strong to retain the internal pressure without distortion or because they have low impact strength and can easily be broken by an accidental blow. Certain solvent resistant plastics of high strength are also known which always fail in a brittle manner.

It is a well known practice to surround the transparent plastics bowl with a perforated metal guard in order to retain the fragments in the event of failure but this practice suffers from the following disadvantages:

1. A perforated metal guard partially obscures the view of the liquid level within the plastics bowl making it extremely difficult under factory conditions to judge the level quickly and accurately.
2. If the number and size of the perforations in the metal guard are increased to improve visibility of liquid level, they may become large enough to permit the passage of fragments of the plastics bowl, should it fail.
3. Many designs of bowl guard are an addition to the filter or lubricator such that, whilst they surround and protect the plastics bowl and will retain fragments, it is easily possible for them to be removed during servicing operations and not replaced so that the filter or lubricator bowl is no longer guarded.
4. Should the plastics bowl fail drastically, then the sudden loss of air pressure may cause an even more serious hazard than any flying fragments.

It is an object of this invention to provide a bowl construction which will mitigate these disadvantages.

According to the invention a bowl assembly, for a compressed air or gas filter or lubricator, comprises a rigid outer bowl and a flexible inner bowl, the outer bowl being formed from a translucent or transparent material of high impact strength for supporting and protecting the inner bowl, the inner bowl being formed from a translucent or transparent material having high resistance to solvent and/or chemical attack, and the outer bowl being vented to atmosphere whereby, in the event of inner bowl failure, the outer bowl will retain the failed inner bowl whilst allowing controlled venting of the air or gas to atmosphere.

With this construction, should the outer bowl crack or craze due to attack by chemicals or solvents, the resulting fragments will not be ejected at high speed since the outer bowl is not under gas pressure and the distortion of the flexible inner bowl will cause the fragments to break away slowly and fall safely to the ground. Conversely, if the flexible inner bowl should split or fail in any manner, the outer bowl will retain the failed inner bowl whilst permitting a controlled escape of the air or gas pressure.

The combined translucency or light transmitting quality of the inner and outer bowls should be such that the level of lubricating oil or water is externally visible. The outer bowl is preferably manufactured from polycarbonate and would consequently be transparent. The inner bowl may be manufactured from any translucent or transparent flexible material of sufficient strength and appropriate high resistance to solvents and/or any other chemical entrained in the compressed air or gas.

A suitable translucent flexible material is polypropylene—one of the plastics most resistant to attack by chemicals and solvents.

Other possible materials are
 (a) Inert transparent poly-vinyl-chloride
 (b) Cellulose-acetate-butyrate
 (c) A co-polymer of polypropylene and vinyl chloride such as that sold under the Registered Trade Mark STA-FLOW.

Polypropylene is insufficiently rigid to withstand, without distortion, the internal air or gas pressure but has the advantage that if overstressed it can be arranged for failure to occur by tearing and not by shattering or sudden bursting.

The outer bowl is preferably vented to atmosphere through at least one vent in its wall. This vent may be arranged through the bottom of the outer bowl. It may be desirable to make such vents crooked to inhibit damage to the inner bowl by the uninstructed insertion of a tool into the vent. Alternatively an upper portion of the outer bowl may be shrouded during use by a part of the filter or lubricator, and the vent is positioned in this upper portion so that the entrance to the vent will also be shrouded. The vent, or at least one of the vents, may be arranged to provide an audible warning, such as a whistle, whenever air or gas escapes through it. This audible warning will serve to attract attention to the failure of the inner bowl.

The wall of the inner bowl may be provided with a controlled weakness which will tear or split, when unsupported by the outer bowl, thereby providing controlled venting of the air or gas pressure. Alternatively an aperture may be arranged through the wall of the inner bowl in a position adjacent a non-vented portion of the outer bowl, whereby application of air or gas pressure within the inner bowl will cause inflation of the inner bowl until the aperture seals against the outer bowl.

When the bowl assembly is attached to an air or gas filter or lubricator, the outer bowl may be detachably secured to a body portion of the filter or lubricator, and the inner bowl has a portion which is trapped between the outer bowl and the body portion. This portion of the inner bowl is preferably an annular flange overlying the upper end of the outer bowl. The annular flange may additionally serve as a seal between the outer bowl and the body portion.

The invention will now be described, by way of example only, with reference to the accompanying drawing which is a vertical section through a compressed air lubricator supported in a yoke, the upper portions being shown in elevation.

With reference to the drawing, a lubricator comprises a body 1 defining an air inlet passage 2, an air outlet passage 3 and a cylindrical skirt 4. The body 1 is formed with a first inclined surface 5 which engages a complementary inclined surface 6 of a yoke 7. A first O-ring 8 is located in a groove formed in the inclined surface 5 around the air inlet passage 2 and seals against the complementary inclined surface 6 so that compressed air will flow from an air supply passage 9 in the yoke 7 to the air inlet passage 2. The body 1 is also formed with a second inclined surface 10 which engages a complementary inclined surface 11 of an insert 12 having a cylindrical portion 13 located in a corresponding bore in the yoke 7. A second O-ring 14 is located in a groove formed in the inclined surface 10 around the air outlet passage 3 and seals against the complementary inclined surface 11 so that lubricated compressed air will flow from the air outlet passage 3 of the lubricator to an air delivery passage 15 through the insert 12.

The lubricator body 1 is locked in the yoke 7 by a nut 16 which engages threads of an unshown upward extension of the body 1 and bears against the upper surface of the yoke 7.

Before the compressed air reaches the air supply passage 9 it would most probably have passed through a filter and a pressure regulator which can conveniently be supported in known manner by the same yoke. The main portion of the filtered and regulated compressed air entering the inlet passage 2 flows past a flow sensor 17 and through unshown passages in the lubricator body 1 direct to the air outlet passage 3. A small portion of the compressed air passes through a check valve 18 to pressurise a reservoir of lubricant 19 which flows up a syphon tube 20 and past an unshown non-return ball valve to the top of a sight feed dome 21. A rotatable adjusting knob 22 controls the feed of oil to a passage 23 leading to an oil fog generator 24. The construction and operation of the lubricator and yoke to this point is already well known. It is also known to provide a rigid polycarbonate bowl for retaining the reservoir of lubricant 19 and to secure such bowl to the lubricator body 1 by means of a screw coupling 25 in the cylindrical skirt 4, an O-ring seal being positioned between the upper end of the bowl and the lubricator body 1.

Instead of the conventional bowl, the lubricator body 1 is fitted with a bowl assembly comprising a rigid outer bowl 26 and a flexible inner bowl 27. The outer bowl is formed from a high impact strength plastics material, such as transparent polycarbonate, and has its upper end threaded to engage the screw coupling 25 of the lubricator body. However, other types of coupling may be used if desired, for instance a bayonet type coupling.

The flexible inner bowl, or liner, 27 is formed from a non-rigid plastics material highly resistant to solvent and/or chemical attack, for instance polypropylene. Ideally the material chosen should be transparent or at least highly translucent. The inner bowl 27 has an integral annular flange 28 which overlies the upper end of the outer bowl 26 and is trapped between the outer bowl 26 and the lubricator body 1. Due to the flexible nature of the material forming the inner bowl 27, the annular flange 28 serves as a seal between the outer bowl 26 and the lubricator body 1 and consequently retains the air pressure within the inner bowl 27.

The outer bowl 26 is vented to atmosphere by means of a series of small vents 29 formed in the upper portion of its wall so that the vents are shrouded by the cylindrical skirt 4. Hiding the vents 29 in this manner avoids the possible danger of an uninstructed machine operator poking a tool through the vent and puncturing the inner bowl 27. For the same purpose the vents 29 may be formed crooked if arranged in unshrouded positions. The vents may be positioned in any convenient part of the outer bowl 26. If desired, a single small vent 30 may be arranged in the bottom of the outer bowl 26. These vents ensure that, under normal circumstances, there is no air pressure within the outer bowl 26 although it does contain the forces exerted on it by the flexible inner bowl 27. Should inner bowl 27 fail, controlled venting to the atmosphere will occur through one or more of vents 29 and 30. Because of the small size of vents 29 and 30, fragments from inner bowl 27 cannot be expelled through vents 29 and 30.

One or more of the vents 29 or 30 may be formed so that the passage through it of compressed air will generate a whistle or other audible warning that the inner bowl 27 has failed. Such audible warning serves to alert the operator that a controlled shut-down procedure should be initiated.

As the inner bowl 27 is relatively thin walled, the internal air pressure will press it firmly against the inner surface of the outer bowl 26, the inner bowl 27 being located axially at its upper end by the trapped annular flange 28. The inner bowl 27 therefore serves to protect the outer bowl 26 from possible attack by air borne solvents or chemicals whilst the outer bowl 26 protects the inner bowl 27 from accidental damage and supports the inner bowl 27 from excessive dilation by the action of the compressed air.

In the event that the outer bowl 26 fails, the inner bowl 27 will be held in position by the portion of the outer bowl 26 still engaging the threads 25, and the inner bowl 27 will then fail in a controlled manner. Even if the threaded portion of the outer bowl 26 is split into pieces during failure, it should be noted that the action of the compressed air in the inner bowl 27 will tend to hold these individual pieces in engagement with the threads 25 as long as air pressure remains within the inner bowl 27.

The inner bowl 27 may be provided with a controlled weakness such as the reduced thickness region 31. When the outer bowl 26 fails so that the reduced thickness region 31 becomes unsupported, the reduced thickness region 31 fails first thereby causing a controlled failure of the inner bowl 27 and a more gradual reduction in the internal air pressure. Instead of being one or more regions of reduced thickness, the controlled weakness could be a partially perforated or cut portion of the inner bowl wall.

It will be noted that, as the inner bowl 27 is retained solely by the engagement of the outer bowl 26 with the lubricator body 1, it is impossible to operate the lubricator if the outer bowl 26 has not been correctly assembled. Similarly if the inner bowl 27 has inadvertently been left out, this will immediately become apparent by the noise of escaping air through the vents.

The construction illustrated can be modified in various ways within the scope of the claims and can be applied to lubricators for gas supplies other than compressed air, or to filters for compressed gas or air.

In particular, the construction illustrated can be modified by providing an aperture through the wall of the inner bowl 27 in a position adjacent a non-vented portion of the outer bowl 26. With this arrangement, the application of air or gas pressure within the inner bowl generates sufficient back pressure to inflate the inner bowl until the aperture seals against the outer bowl and enables full internal pressure to be established. In the event of outer bowl failure, the aperture then functions in a similar manner to the previously described controlled weakness by providing controlled deflation. With this construction it will be noted that the aperture exposes a portion of the outer bowl to direct contact with any airborne chemicals or solvents and that this portion will consequently be liable to earlier failure than with constructions in which the integrity of the inner bowl is maintained.

What is claimed is:

1. A compressed gas processing apparatus which includes a body having a gas inlet passage and a gas outlet passage, a bowl assembly supported by the body in fluid communication with the inlet and outlet passages, the improvement in the bowl assembly including:
   an outer bowl having an impervious side wall made of high impact strength translucent material, said wall having an extremity at the top of said wall and an extremity at the bottom of said wall;
   a thin flexible, impervious, translucent inner bowl having high resistance to chemical attach from chemicals within the processing apparatus, said inner bowl being positioned within and supported by and in substantially total surface contact with said outer bowl against the force of the compressed gas; and
   vent means positioned only at at least one of said extremities of said side wall of said outer bowl and being of sufficiently small size that in the event of inner bowl failure, fragments from said inner bowl cannot pass through said vent means and said vent means will provide controlled venting of the compressed gas in the processing apparatus to the atmosphere.

2. Compressed gas processing apparatus, as in claim 1, in which said outer bowl is manufactured from polycarbonate.

3. Compressed gas processing apparatus, as in claim 1, in which the inner bowl is manufactured from a material in the group comprising polypropylene, poly-vinyl-chloride, cellulose acetate butyrate, and a copolymer of polypropylene and vinyl chloride.

4. Compressed gas processing apparatus, as in claim 1, in which said inner bowl is formed from a transparent material.

5. Compressed gas processing apparatus, as in claim 1, in which said outer bowl is formed from a transparent material.

6. Compressed gas processing apparatus, as in claim 1, in which said vent means is positioned through the bottom of said outer bowl.

7. Compressed gas processing apparatus, as in claim 1, in which said body shrouds an upper portion of the wall of said outer bowl, and said vent means is positioned through said upper portion of said wall.

8. Compressed gas processing apparatus, as in claim 1, in which said vent means incorporates means for providing an audible warning whenever air or gas escapes through said vent.

9. Compressed gas processing apparatus, as in claim 1, in which said inner bowl has a weakened portion which will rupture when unsupported by said outer bowl to provide controlled venting of the gas pressure.

10. Compressed gas processing apparatus, as in claim 1, in which an aperture is positioned through the wall of said inner bowl in a position adjacent a non-vented portion of said outer bowl, whereby application of gas pressure within said inner bowl will cause inflation of said inner bowl until the aperture seals against said outer bowl.

11. Compressed gas processing apparatus, as in claim 1, in which said outer bowl has an open end detachably secured to said body and said inner bowl has a portion which extends over said open end to form a flange which serves as a seal between said outer bowl and said body.

12. A compressed gas processing apparatus which includes a body having a gas inlet passage and a gas outlet passage, a bowl asembly supported by the body in fluid communication with the inlet and outlet passages, the improvement in the bowl assembly including:
   an inner bowl having a thin flexible wall made of an impervious light-transmitting material having high resistance to attack from chemicals within said processing apparatus and having an outwardly facing surface;
   an outer bowl having an impervious wall made of high impact strength, light-transmitting material and having an inwardly facing surface, said inner bowl being positioned within said outer bowl to isolate said outer bowl from contact with compressed gas and chemicals within said processing apparatus, said outwardly facing surface of said inner bowl being in total surface contact with said inwardly facing surface of said outer bowl so that said inner bowl is totally supported by said outer bowl against the force of the compressed gas, so that said outer bowl will retain substantially all fragments of said inner bowl in the event of inner bowl failure; and
   pressure controlling vent means extending through said impervious wall of said outer bowl, said vent means comprising at least one gas flow restricting passage to control the rate at which compressed gas within the processing apparatus will vent to the atmosphere in the event of inner bowl failure.

13. The improvement of claim 12, wherein: said inner bowl is inflated by the action of the compressed gas on said flexible wall to cause said outwardly facing surface of said inner bowl to make substantially total surface contact with said inwardly facing surface of said outer bowl so that said inner bowl is substantially totally supported by said outer bowl.

14. The improvement of claim 12, wherein: said outer bowl is transparent.

15. The improvement of claim 12, wherein: said inner bowl is transparent.

* * * * *